US012709570B2

(12) United States Patent
An et al.

(10) Patent No.: US 12,709,570 B2
(45) Date of Patent: Aug. 18, 2026

(54) METHOD OF MANUFACTURING WINDOW, WINDOW MANUFACTURED BY THE METHOD OF MANUFACTURING WINDOW, AND DISPLAY DEVICE INCLUDING THE WINDOW

(71) Applicant: Samsung Display Co., Ltd., Yongin-si (KR)

(72) Inventors: Taeho An, Hwaseong-si (KR); Jeong Seok Lee, Suwon-si (KR); Jun Hak Oh, Incheon (KR); Sookkyung You, Seoul (KR); Hyun-Il Cho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 408 days.

(21) Appl. No.: 18/098,941

(22) Filed: Jan. 19, 2023

(65) Prior Publication Data

US 2023/0312411 A1 Oct. 5, 2023

(30) Foreign Application Priority Data

Apr. 1, 2022 (KR) ........................ 10-2022-0040952

(51) Int. Cl.
*C03C 21/00* (2006.01)

(52) U.S. Cl.
CPC ........ *C03C 21/002* (2013.01); *C03C 2203/52* (2013.01)

(58) Field of Classification Search
None
See application file for complete search history.

(56) References Cited

U.S. PATENT DOCUMENTS 8,312,739 B2 * 11/2012 Lee ......................... C03C 3/093 65/30.13
8,561,429 B2 * 10/2013 Allan ...................... C03C 3/093 65/400
10,239,784 B2 * 3/2019 Oram ...................... C03C 3/097
10,550,029 B2 2/2020 Gross et al.
10,611,681 B2 4/2020 Dejneka et al.
10,710,920 B2 7/2020 Ellison et al.
10,752,542 B2 * 8/2020 Bookbinder .......... C03C 21/002
10,899,654 B2 * 1/2021 Li ............................. C03C 4/18
11,059,744 B2 7/2021 Oram et al.
(Continued)

FOREIGN PATENT DOCUMENTS

EP 3792228 B1 * 7/2024 ........... C03C 23/007
JP 2022515312 A 2/2022
(Continued)

*Primary Examiner* — Jodi C Franklin
(74) *Attorney, Agent, or Firm* — CANTOR COLBURN LLP

(57) ABSTRACT

A method of manufacturing a window, includes: preparing a first preliminary glass substrate that does not contain $Li^+$ ions and contains $Na^+$ ions; providing a first strengthening molten salt to the first preliminary glass substrate to form a second preliminary glass substrate; providing heat to the second preliminary glass substrate at a temperature of about 400 to 500° C. for a period of about 3 to 7 hours to form a third preliminary glass substrate; and providing a second strengthening molten salt to the third preliminary glass substrate to form a window.

3 Claims, 13 Drawing Sheets

(56) References Cited

U.S. PATENT DOCUMENTS

| | | | | |
|---|---|---|---|---|
| 11,079,309 | B2 * | 8/2021 | Morey | C03C 3/091 |
| 11,691,912 | B2 * | 7/2023 | Tatebe | H01M 50/1245 65/30.14 |
| 12,037,282 | B2 * | 7/2024 | Higginbottom | C03C 23/007 |
| 2007/0087139 | A1 | 4/2007 | Creux et al. | |
| 2010/0009154 | A1 * | 1/2010 | Allan | C03C 3/093 501/67 |
| 2010/0028607 | A1 * | 2/2010 | Lee | C03C 3/093 428/156 |
| 2017/0334770 | A1 * | 11/2017 | Luzzato | C03C 4/18 |
| 2017/0355640 | A1 | 12/2017 | Oram et al. | |
| 2018/0251400 | A1 * | 9/2018 | Bookbinder | C03C 4/18 |
| 2018/0297892 | A1 * | 10/2018 | Lee | C03C 3/083 |
| 2019/0023611 | A1 * | 1/2019 | Luzzato | C03C 21/002 |
| 2019/0104627 | A1 * | 4/2019 | Chambliss | H05K 5/0086 |
| 2019/0106353 | A1 * | 4/2019 | Rai | C03C 21/002 |
| 2019/0161402 | A1 * | 5/2019 | Harris | C03C 21/002 |
| 2019/0202735 | A1 | 7/2019 | Oram et al. | |
| 2019/0248702 | A1 * | 8/2019 | Lee | B24B 1/00 |
| 2020/0002225 | A1 * | 1/2020 | Schneider | C03C 3/091 |
| 2020/0017406 | A1 * | 1/2020 | Wilson | G06F 1/1656 |
| 2020/0131085 | A1 * | 4/2020 | Hu | C03C 3/097 |
| 2020/0223750 | A1 | 7/2020 | Dejneka et al. | |
| 2020/0299186 | A1 * | 9/2020 | Alder | C03C 21/007 |
| 2021/0292225 | A1 * | 9/2021 | Umada | C03C 3/087 |
| 2022/0017411 | A1 | 1/2022 | Lee et al. | |
| 2022/0024817 | A1 * | 1/2022 | Dejneka | B23K 26/0861 |
| 2022/0064055 | A1 * | 3/2022 | Guo | C03C 10/0027 |
| 2022/0242780 | A1 * | 8/2022 | Hunt | C03C 21/002 |
| 2022/0317340 | A1 * | 10/2022 | Amin | G02B 1/115 |
| 2022/0348496 | A1 * | 11/2022 | Baker | C03C 3/097 |
| 2022/0402801 | A1 * | 12/2022 | Benjamin | C03B 23/0256 |
| 2023/0060972 | A1 * | 3/2023 | Umada | C03C 3/087 |
| 2023/0082423 | A1 * | 3/2023 | Kanehara | C03C 3/097 428/220 |
| 2024/0140861 | A1 * | 5/2024 | Pei | C03C 4/18 |

FOREIGN PATENT DOCUMENTS

| | | | |
|---|---|---|---|
| KR | 1020060017862 | A | 2/2006 |
| KR | 101617071 | B1 | 4/2016 |
| KR | 1020170077237 | A | 7/2017 |
| KR | 1020180012236 | A | 2/2018 |
| KR | 1020180091862 | A | 8/2018 |
| KR | 1020180095559 | A | 8/2018 |
| KR | 1020190020028 | A | 2/2019 |
| KR | 102119191 | B1 | 6/2020 |
| KR | 1020200062277 | A | 6/2020 |
| KR | 102128490 | B1 | 7/2020 |
| KR | 1020200085387 | A | 7/2020 |
| KR | 102272926 | B1 | 7/2021 |

* cited by examiner

METHOD OF MANUFACTURING WINDOW, WINDOW MANUFACTURED BY THE METHOD OF MANUFACTURING WINDOW, AND DISPLAY DEVICE INCLUDING THE WINDOW

This application claims priority to Korean Patent Application No. 10-2022-0040952, filed on Apr. 1, 2022, and all the benefits accruing therefrom under 35 U.S.C. § 119, the content of which in its entirety is herein incorporated by reference.

BACKGROUND

The present disclosure herein relates to a method of manufacturing a window that includes providing heat, a window manufactured thereby, and a display device including the window.

A display device is activated according to electrical signals, and includes a window, a housing, and an electronic element. The electronic element may include various types of elements activated according to electrical signals, such as a display element, a touch element, or a detection element. The window protects the electronic element and provides active regions to users. The electronic element may be stably protected from external shocks by the window. Accordingly, a method of strengthening a window to exhibit excellent strength is being studied.

SUMMARY

The present disclosure provides a window exhibiting increased strength and a method of manufacturing the window.

The present disclosure also provides a display device including a window that exhibits increased strength.

An embodiment of the invention provides a method of manufacturing a window, the method including: preparing a first preliminary glass substrate that does not contain $Li^+$ ions and contains $Na^+$ ions; providing a first strengthening molten salt to the first preliminary glass substrate to form a second preliminary glass substrate; providing heat to the second preliminary glass substrate at a temperature of about 400 to 500 degrees in Celsius (° C.) for a period of about 3 to 7 hours to form a third preliminary glass substrate; and providing a second strengthening molten salt to the third preliminary glass substrate to form a window.

In an embodiment, the first strengthening molten salt may include $NaNO_3$ and at least one of $KNO_3$, KCl, or $K_2SO_4$.

In an embodiment, with respect to a total weight of the first strengthening molten salt, $NaNO_3$ may be provided in an amount of about 20 to 40 percentages by weight (wt %), and the at least one of $KNO_3$, KCl, or $K_2SO_4$ may be provided in an amount of about 60 to 80 wt %.

In an embodiment, the second strengthening molten salt may not include $NaNO_3$, and may include at least one of $KNO_3$, KCl, or $K_2SO_4$.

In an embodiment, in the forming of the second preliminary glass substrate, the first strengthening molten salt may be provided at a temperature of about 450 to 500° C. for a period of about 3 to 9 hours.

In an embodiment, in the forming of the window, the second strengthening molten salt may be provided at a temperature of about 380 to 420° C. for a period of about 1 hour to 2 hours.

In an embodiment, the window may include a compressive stress layer having a compressive stress of about 1000 megapascals (MPa) or less as measured through a method of ASTM C770-16, and the compressive stress layer may have a thickness of about 80 to 100 micrometers (μm).

In an embodiment, the first preliminary glass substrate may further include at least one of $K^+$ ions or $Mg^{2+}$ ions.

In an embodiment, the method may further include forming a printing layer in the forming of the window.

In an embodiment of the invention, a window includes a glass substrate that does not contain $Li^+$ ions and contains $K^+$ ions, where the window includes: a base layer having a compressive stress value of zero; and a compressive stress layer disposed on at least one of an upper surface or a lower surface of the base layer. The compressive stress layer includes: a first region having a first compressive stress change rate; a second region having a second compressive stress change rate that is at least 5 times the first compressive stress change rate; and an inflection region having a third compression stress change rate that increases from the first compressive stress change rate to the second compressive stress change rate, and which is formed between the first region and the second region. Each of the first compressive stress change rate, the second compressive stress change rate, and the third compressive stress change rate is defined as a compressive stress change rate according to a depth in a thickness direction, a minimum depth from a surface of the window to the inflection region in the thickness direction is about 15 to 30 μm, and the compressive stress layer has a thickness of about 80 to 100 μm.

In an embodiment, the inflection region may be spaced apart from the base layer with the first region therebetween.

In an embodiment, with respect to 100% of a total thickness of the glass substrate, the thickness of the compressive stress layer may be about 13 to 21%.

In an embodiment, the glass substrate may have a thickness of about 500 to 700 μm.

In an embodiment, a maximum value of the compressive stress measured through a method of ASTM C770-16 in the second region may be about 600 to 1000 MPa.

In an embodiment, a compressive stress measured through the method of ASTM C770-16 in the inflection region may be about 120 MPa or greater.

In an embodiment, a compressive stress measured through the method of ASTM C770-16 at a depth of about 30 μm from the surface of the window in the thickness direction may be about 70 MPa or greater.

In an embodiment, a compressive stress measured through the method of ASTM C770-16 at a depth of about 50 μm from the surface of the window in the thickness direction may be about 50 MPa or greater.

In an embodiment of the invention, a display device includes: a display module; and a window disposed on at least one of an upper portion or a lower portion of the display module and including a compressive stress layer. The compressive stress layer includes: a first region having a first compressive stress change rate; a second region having a second compressive stress change rate that is at least 5 times the first compressive stress change rate; and an inflection region having a third compression stress change rate that increases from the first compressive stress change rate to the second compressive stress change rate, and which is formed between the first region and the second region. Each of the first compressive stress change rate, the second compressive stress change rate, and the third compressive stress change rate is defined as a compressive stress change rate according to a depth in a thickness direction, a minimum depth from a surface of the window to the inflection region in the thickness direction is about 15 to 30 μm, and the compressive stress layer has a thickness of about 80 to 100 μm.

In an embodiment, the window may include a glass substrate that does not contain $Li^+$ ions and contains $K^+$ ions.

In an embodiment, a compressive stress measured through a method of ASTM C770-16 at a depth of about 30 μm from the surface of the window in the thickness direction may be about 70 MPa or greater, and a compressive stress measured through the method of ASTM C770-16 at a depth of about 50 μm from the surface of the window in the thickness direction may be about 50 MPa or greater.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
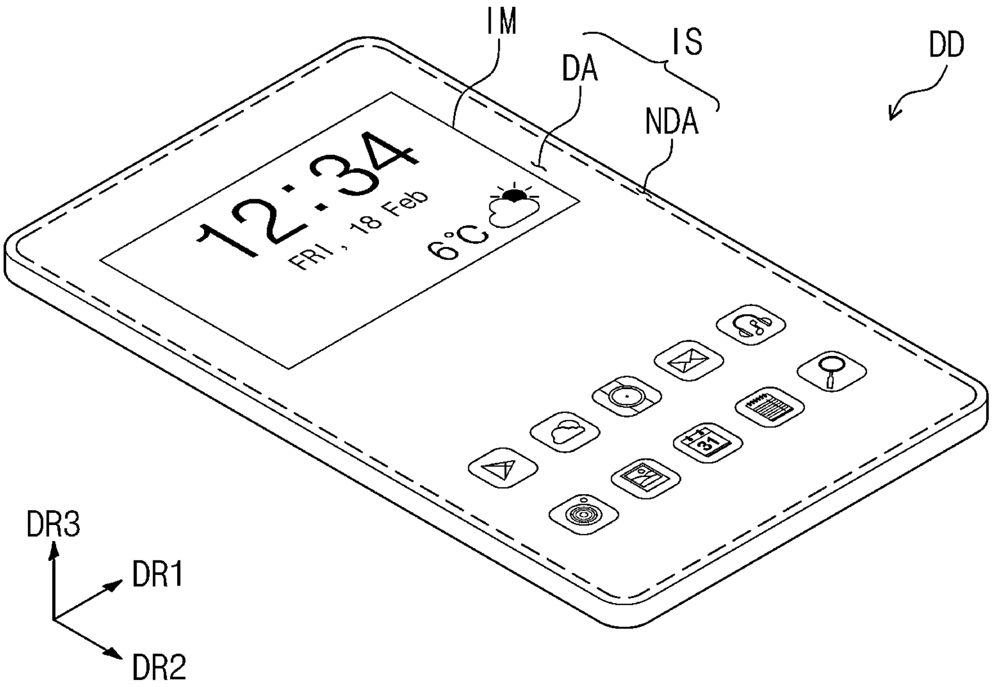
FIG. 1 is a perspective view showing a display device according to an embodiment.

The present disclosure may be modified in many alternate forms, and thus specific embodiments will be exemplified in the drawings and described in detail. It should be understood, however, that it is not intended to limit the present disclosure to the particular forms disclosed, but rather, is intended to cover all modifications, equivalents, and alternatives falling within the spirit and scope of the present disclosure.

In the present description, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. In addition, in the drawings, the thickness, the ratio, and the dimensions of elements are exaggerated for an effective description of technical contents. "At least one" is not to be construed as limiting "a" or "an." "Or" means "and/or." The term "and/or," includes all combinations of one or more of which associated configurations may define.

It will be understood that, although the terms "first", "second", etc. may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise.

Also, terms of "below", "on lower side", "above", "on upper side", or the like may be used to describe the relationships of the components illustrated in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure pertains. It is also to be understood that terms defined in commonly used dictionaries should be interpreted as having meanings consistent with the meanings in the context of the related art, and are expressly defined herein unless they are interpreted in an ideal or overly formal sense.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Hereinafter, a window according to an embodiment and a display device including the same will be described with reference to the accompanying drawings. FIG. 1 is a perspective view showing a display device according to an embodiment.

A display device DD may be a device activated according to electrical signals. The display device DD may be a flexible device. For example, the display device DD may be a portable electronic device, a tablet, a car navigation system, a game console, a personal computer, a laptop computer, or a wearable device, but is not limited thereto. In FIG. 1, a portable electronic device is presented as an example of the display device DD.

The display device DD may display an image IM through a display surface IS. The display surface IS may include a display region DA and a non-display region NDA adjacent to the display region DA. The non-display region NDA may be a portion in which images are not displayed. However, the embodiment of the invention is not limited thereto, and the non-display region NDA may be omitted in another embodiment. The display surface IS may include a plane defined by a first directional axis DR1 and a second directional axis DR2.

The first directional axis DR1 and the second directional axis DR2 herein may be perpendicular to each other, and a third directional axis DR3 may be a normal direction to a plane defined by the first directional axis DR1 and the second directional axis DR2. A thickness direction of the display device DD may be parallel to the third directional axis DR3. An upper surface (or a front surface) and a lower surface (or a rear surface) of members constituting the display device DD herein may be defined with respect to the third directional axis DR3.

Directions indicated by the first to third directional axes DR1, DR2, and DR3 as described herein are relative concepts, and may thus be changed to other directions. In addition, the directions indicated by the first to third directional axes DR1, DR2, and DR3 may be described as first to third directions, and the same reference numerals may be used.

Figure 2:
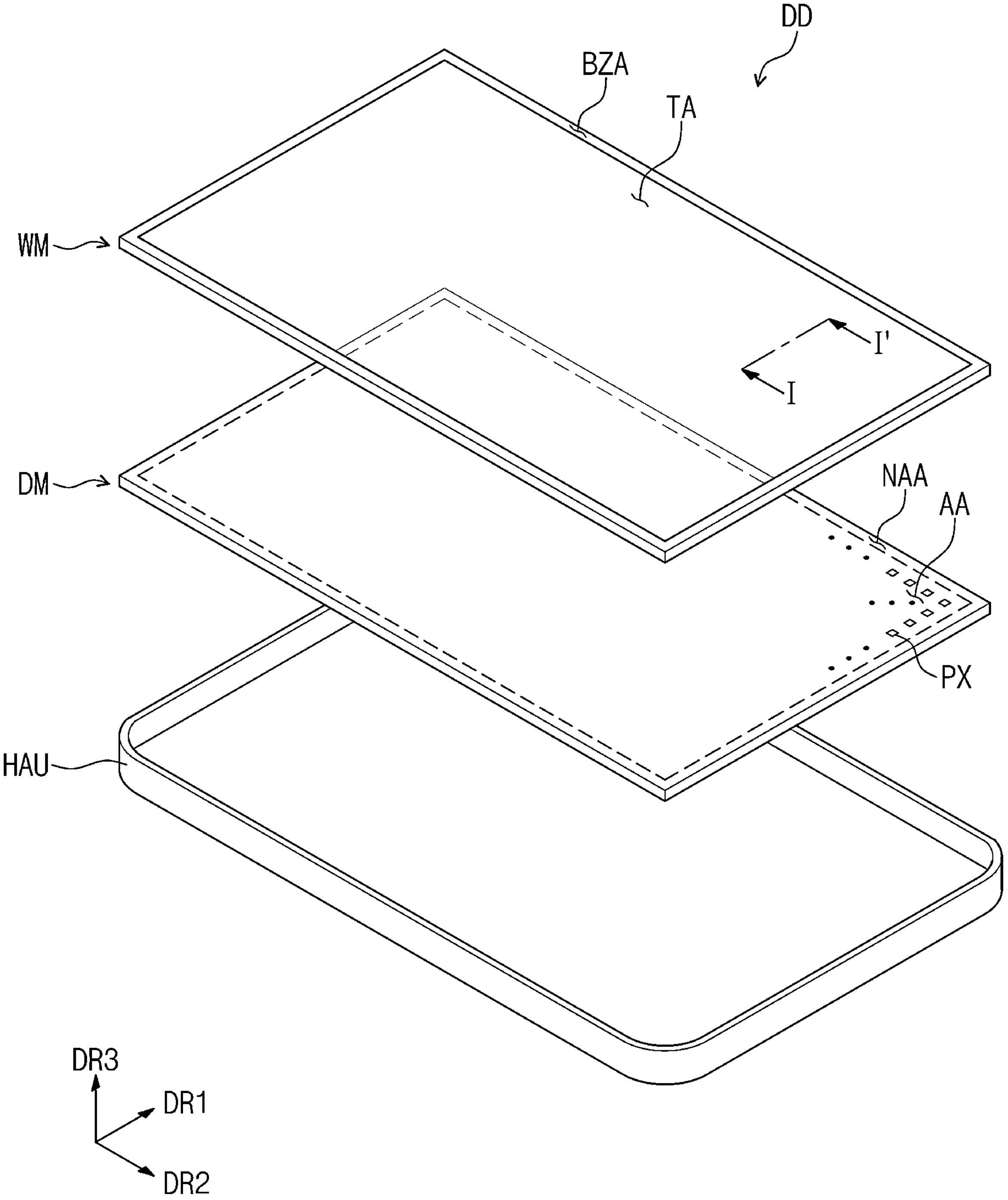
FIG. 2 is an exploded perspective view showing a display device according to an embodiment.

FIG. 2 is an exploded perspective view of a display device according to an embodiment. The display device DD may include a display module DM and a window WM disposed on at least one of an upper portion or a lower portion of the display module DM. In FIG. 2, the window WM is shown to be disposed above the display module DM, but this is presented as an example, and the window WM may be disposed both above and below the display module DM.

In addition, the display device DD may further include a housing HAU accommodating the display module DM. In the display device DD shown in FIGS. 1 and 2, the window WM and the housing HAU may be combined together to form an exterior of the display device DD. The housing HAU may be disposed below the display module DM. The housing HAU may include a material having a relatively higher rigidity. For example, the housing HAU may include a plurality of frames and/or plates formed of glass, plastic, or metal. The housing HAU may provide a predetermined place for accommodation. The display module DM may be accommodated in the accommodation place to be protected from external shocks.

The display module DM may be activated according to electrical signals. The display module DM may be activated to display the image IM on the display surface IS of the display device DD. In addition, the display module DM may be activated to detect external inputs applied to an upper surface. The external inputs may include a user's touch, contact or proximity of intangible objects, pressure, light, or heat, and are not limited to any one embodiment.

The display module DM may include an active region AA and a peripheral region NAA. The active region AA may be a portion providing the image IM (FIG. 1). In the active region AA, a pixel PX may be disposed. The peripheral region NAA may be adjacent to the active region AA. The peripheral region NAA may cover the active region AA. A driving circuit, a driving line, or the like for driving the active region AA may be disposed in the peripheral region NAA.

The display module DM may include a plurality of pixels PX. Each of the pixels PX may display light in response to electrical signals. The light displayed by the pixels PX may implement the image IM. Each of the pixels PX may include a display element. For example, the display element may be an organic light emitting element, a quantum dot light emitting element, an electrophoretic element, an electrowetting element, or the like.

The window WM may include a transmission region TA and a bezel region BZA. The transmission region TA may overlap at least a portion of the active region AA of the display module DM in the third direction DR3. The transmission region TA may be an optically transparent area. For example, the transmission region TA may have a transmittance of about 90% or greater with respect to the wavelength of visible light ranges. The image IM may be provided to users through the transmission region TA, and the users may receive information through the image IM.

The bezel region BZA may be a portion having a relatively lower light transmittance than the transmission region TA. The bezel region BZA may define a shape of the transmission region TA. The bezel region BZA may be adjacent to the transmission region TA and may surround the transmission region TA.

The bezel region BZA may have a predetermined color. The bezel region BZA may cover the peripheral region NAA of the display module DM to prevent the peripheral region NAA from being viewed from the outside. However, this is merely presented as an example and the bezel region BZA may be omitted in the window WM according to an embodiment.

Figure 3:
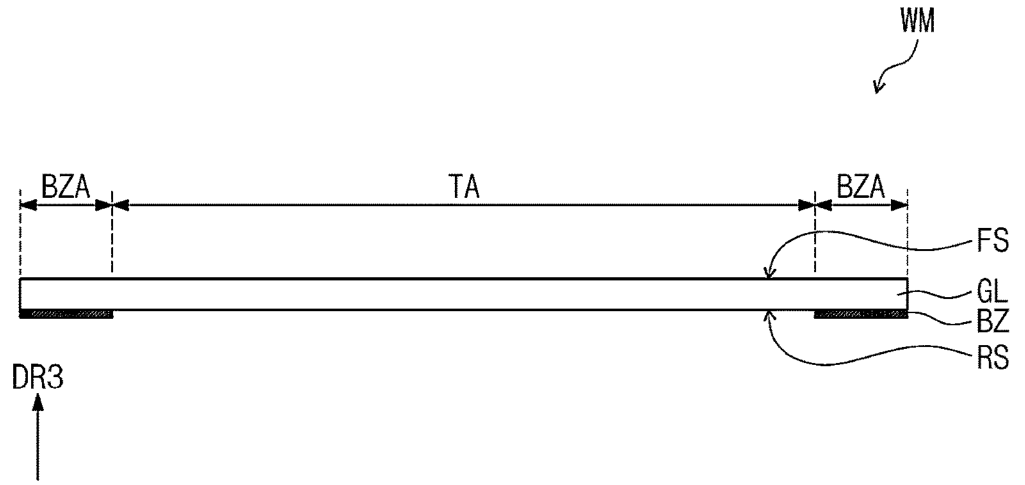
FIG. 3 is a cross-sectional view showing a window according to an embodiment.

FIG. 3 is a cross-sectional view showing a window WM according to an embodiment. The window WM may include a glass substrate GL, and the glass substrate GL may not include $Li^+$ ions and may include $K^+$ ions. The glass substrate GL may be strengthened in the method of manufacturing a window according to an embodiment, which will be described later. In an embodiment, the window WM including the strengthened glass substrate GL may include a glass substrate GL in which $Na^+$ ions are replaced with $K^+$ ions. Accordingly, the glass substrate GL including $K^+$ ions may exhibit increased compressive stress, and the window WM including the glass substrate GL may exhibit excellent strength.

Referring to FIG. 3, the glass substrate GL may include an upper surface FS and a lower surface RS facing the upper surface FS. The upper surface FS of the glass substrate GL may be exposed to the outside of the display device DD, and may define an upper surface of the window WM and an upper surface of the display device DD.

The window WM may further include a printing layer BZ disposed on the lower surface RS of the glass substrate GL. The printing layer BZ may be formed on the lower surface RS of the glass substrate GL through a process of printing or deposition, and the printing layer BZ may be directly disposed on the lower surface RS of the glass substrate GL.

The printing layer BZ may be disposed on the lower surface RS of the glass substrate GL to define the bezel region BZA. The printing layer BZ may have a relatively lower light transmittance than the glass substrate GL. For example, the printing layer BZ may have a predetermined color. Accordingly, the printing layer BZ may selectively transmit/reflect light of only a specific color. In another embodiment, the printing layer BZ may be a light blocking layer for absorbing incident light. The light transmittance and color of the printing layer BZ may be variously provided according to type and shape of the display device DD.

Figure 4:
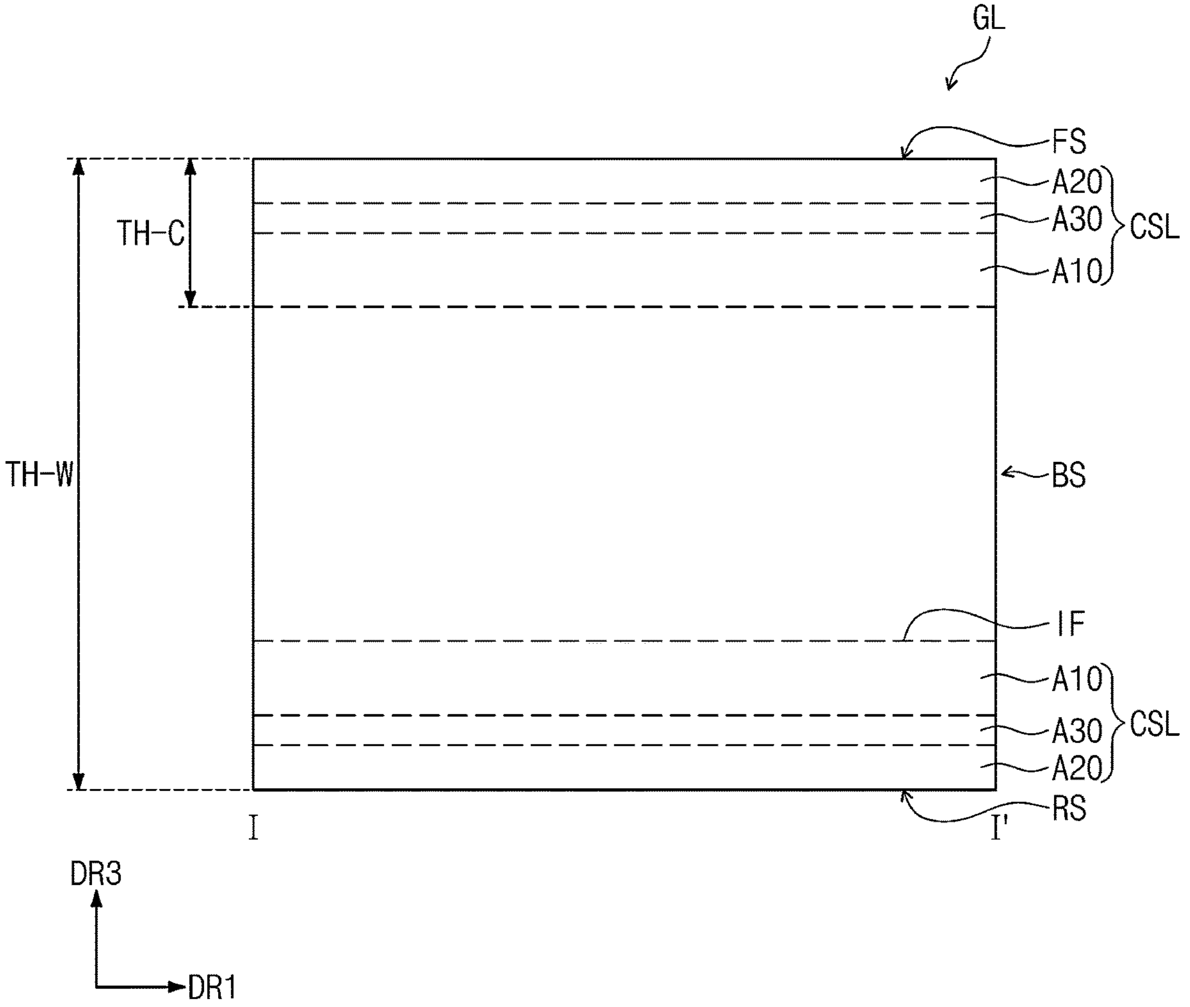
FIG. 4 is a cross-sectional view showing a portion corresponding to line I-I' of FIG. 2.

FIG. 4 is a view showing a portion corresponding to line I-I' of FIG. 2. FIG. 4 shows a glass substrate GL in more detail in the window WM according to an embodiment.

The window WM may include a glass substrate GL that does not contain $Li^+$ ions and contains $K^+$ ions. The glass substrate GL may be glass including an alumino-silicate framework formed from $Al_2O_3$ and $SiO_2$. In an embodiment, the glass substrate GL may further contain at least one of $Na^+$ ions or $Mg^+$ ions. When the glass substrate GL includes $Na^+$ ions and $K^+$ ions, the number of $K^+$ ions may be greater than the number of $Na^+$ ions with respect to the total number of ions in a compressive stress layer CSL of the glass substrate GL. The window WM according to an embodiment may be formed through a method of manufacturing a window according to an embodiment, which will be described later. The window WM formed through the method of manufacturing a window according to an embodiment may include a compressive stress layer CSL having different compressive stress values according to depth. In the window WM formed through the method of manufacturing a window according to an embodiment, in the compressive stress layer CSL, the number of $K^+$ ions may be greater than the number of $Na^+$ ions.

The glass substrate GL according to an embodiment may include a base layer BS and a compressive stress layer CSL. The compressive stress layer CSL may be disposed on at least one of an upper surface or a lower surface of the base layer BS, and FIG. 4 shows that the compressive stress layer CSL is disposed on both the upper surface and the lower surface of the base layer BS. However, this is merely an example, and the compressive stress layer CSL may be disposed only on one of the upper surface of the base layer BS or the lower surface of the base layer BS. The upper surface of the base layer BS and the lower surface of the base layer BS may face each other in the third directional axis DR3.

The base layer BS and the compressive stress layer CSL may contact each other. The base layer BS may have a compressive stress value of zero. The compressive stress layer CSL may be defined as a layer having a compressive stress value exceeding zero. At an interface IF between the base layer BS and the compressive stress layer CSL, the compressive stress may be zero.

With respect to 100% of a total thickness TH-W of the glass substrate GL, a thickness TH-C of the compressive stress layer CSL may be about 13 to 21%. For example, with respect to 100% of the total thickness TH-W of the glass substrate GL, the thickness TH-C of the compressive stress layer CSL may be about 13 to 16%. Alternatively, with respect to 100% of the total thickness TH-W of the glass substrate GL, the thickness TH-C of the compressive stress layer CSL may be about 16 to 21%.

The thickness TH-W of the glass substrate GL may be about 500 to 700 micrometers (μm). The thickness TH-C of the compressive stress layer CSL may be about 80 to 100 μm. The window WM including the compressive stress layer CSL having a thickness of about 13 to 21% with respect to 100% of the total thickness TH-W of the glass substrate GL may exhibit excellent strength. On the other hand, with respect to 100% of the total thickness of the glass substrate, a window including a compressive stress layer having a thickness of less than 13% exhibits a small strength, and the window exhibits properties vulnerable to external shocks.

The compressive stress layer CSL may include a first region A10 having a first compressive stress change rate, a second region A20 having a second compressive stress change rate, and an inflection region A30 having a third compressive stress change rate increasing from the first compressive stress change rate to the second compressive stress change rate. The first region A10 may be in contact with the base layer BS, and the inflection region A30 may be spaced apart from the base layer BS with the first region A10 therebetween. The second region A20 may be a portion disposed on the upper surface FS of the glass substrate GL and/or the lower surface RS of the glass substrate GL.

The inflection region A30 may be formed between the first region A10 and the second region A20. Each of the first compressive stress change rate and the second compressive stress change rate may be defined as a compressive stress change rate according to depth in the thickness direction (i.e., the third direction DR3). A minimum depth from the surface of the window WM to the inflection region A30 may be about 15 to 30 μm. The window WM according to an embodiment may include the inflection region A30 having a minimum depth of about 15 to 30 μm to exhibit increased strength.

The compressive stress change rate herein may be defined as a compressive stress change rate according to depth in the thickness direction. That is, in a graph in which the depth is a horizontal axis and the compressive stress is a vertical axis, the compressive stress change rate may be defined as an absolute value of a slope. In the graph in which the depth is a horizontal axis and the compressive stress is a vertical axis, change in compressive stress according to change in depth may be defined as a compressive stress change rate. A point having a value of zero in the horizontal axis is may be the upper surface FS or the lower surface RS of the glass substrate GL.

Figure 5:
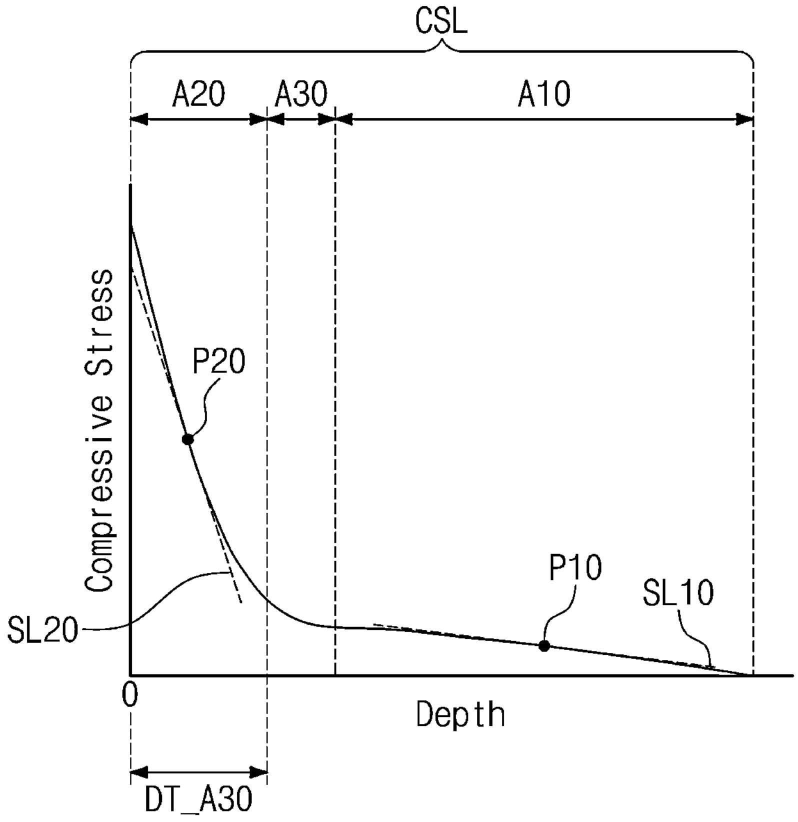
FIG. 5 is a graph showing compressive stress according to depth in a window according to an embodiment.

FIG. 5 is a graph schematically showing compressive stress according to depth in a compressive stress layer CSL according to an embodiment. In FIG. 5, the vertical axis is the value of compressive stress, the horizontal axis is the depth indicated in the thickness direction, and the point where the depth is zero is the upper surface FS or the lower surface RS of the glass substrate GL. In FIG. 5, the depth may increase in the order of the second region A20, the inflection region A30, and the first region A10, and the compressive stress value may decrease in the order of the second region A20, the inflection region A30, and the first region A10. That is, the value of the compressive stress in the second region A20 may be greater than each of the value of the compressive stress in the first region A10 and the value of the compressive stress in the inflection region A30. The value of the compressive stress in the first region A10 may be smaller than each of the value of the compressive stress in the second region A20 and the value of the compressive stress in the inflection region A30. In FIG. 5, a region deeper than the first region A10 may correspond to the base layer BS (FIG. 4).

The second region A20 may have a second slope SL20 in the graph of compressive stress according to depth. The second slope SL20 corresponds to the second compressive stress change rate of the second region A20. The second slope SL20 may indicate an instantaneous change rate of any one point P20 in the second region A20 shown in FIG. 5. That is, the second slope SL20 may be a tangential slope of any one point P20 in the second region A20 shown in FIG. 5. The absolute value of the second slope SL20 of the second region A20 may be greater than the absolute value of the first slope SL10 of the first region A10.

The first region A10 may have a first slope SL10 in the graph of compressive stress according to depth. The first slope SL10 corresponds to the first compressive stress change rate of the first region A10. The first slope SL10 may indicate an instantaneous change rate of any one point P10 in the first region A10 shown in FIG. 5. That is, the first slope SL10 may be a tangential slope of any one point P10 in the first region A10 shown in FIG. 5.

The second compressive stress change rate may be at least 5 times the first compressive stress change rate. That is, the second slope SL20 shown in FIG. 5 may be about at least 5 times the first slope SL10. In another example, the second slope SL20 may be about at least 10 times or about at least 20 times the first slope SL10. For example, the second slope SL20 shown in FIG. 5 may be about 3.03, and the first slope SL10 may be about 0.13. However, this is merely an example, and the value of the first slope SL10 in the first region A10 and the value of the second slope SL20 in the second region A20 are not limited thereto.

The inflection region A30 may increase from the first compressive stress change rate to the second compressive stress change rate. A compressive stress measured through a method of ASTM C770-16 in the inflection region A30 may be about 120 megapascals (MPa) or greater. For an example, a compressive stress measured through the method of ASTM C770-16 in the inflection region A30 may be less than about 600 MPa. As used herein, the method of ASTM C770-16 is a name of an internationally-published standard test method for measurement of glass stress—optical coefficient (See https://www.astm.org/c0770-16r20.html).

A minimum depth DT_A30 of the inflection region A30 may be about 15 to 30 μm. The minimum depth DT_A30 of the inflection region A30 may be defined as a minimum depth from the surface of the window WM to the inflection region A30 in the thickness direction (i.e., the third direction DR3). The surface of the window WM may correspond to a point where the depth is zero in FIG. 5, and the surface of the window WM may be the upper surface FS (FIG. 3) of the glass substrate GL or the lower surface RS (FIG. 3) of the glass substrate GL.

The minimum depth DT_A30 of the inflection region A30 may be the same as the thickness of the second region A20. For example, when the minimum depth DT_A30 of the inflection region A30 is about 15 μm, the region having a depth of about 0 to 15 μm may be the second region A20. Alternatively, when the minimum depth DT_A30 of the inflection region A30 is about 30 μm, the region having a depth of about 0 to 30 μm may be the second region A20.

A maximum value of the compressive stress in the second region A20 may be about 600 to 1000 MPa, and the compressive stress may be measured through the method of ASTM C770-16. The maximum value of the compressive stress in the second region A20 may be a compressive stress value at a point where the depth is zero. In addition, the compressive stress value decreases as the depth of the compressive stress layer increases, and the maximum value of the compressive stress in the second region A20 may thus be the maximum value of the compressive stress in the compressive stress layer. In FIG. 5, the point having a depth of zero may have a compressive stress of about 600 to 1000 MPa. The compressive stress on the surface (i.e., the upper surface FS and/or the lower surface RS) of the glass substrate GL may be about 600 to 1000 MPa.

In the compressive stress layer CSL, a point having a depth of about 30 μm may have a compressive stress of about 70 MPa or greater as measured through the method of ASTM C770-16. The point having a depth of about 30 μm in the compressive stress layer CSL may be included in the inflection region A30 or the first region A10. For example, at the point where the depth of the compressive stress layer CSL is about 30 μm, the compressive stress may be about 72 to 134 MPa. However, this is presented as an example, and the embodiment of the invention is not limited thereto.

In addition, in the compressive stress layer CSL, a point having a depth of about 50 μm may have a compressive stress of about 50 MPa or greater as measured through the method of ASTM C770-16. The point having a depth of about 50 μm in the compressive stress layer CSL may be included in the inflection region A30 or the first region A10. For example, at the point where the depth of the compressive stress layer CSL is about 50 μm, the compressive stress may be about 58 to 81 MPa. However, this is presented as an example, and the embodiment of the invention is not limited thereto.

As the compressive stress value in the compressive stress layer CSL according to an embodiment satisfies a predetermined range, the window WM including the compressive stress layer CSL may exhibit increased strength. In addition, the display device DD including the window WM according to an embodiment may exhibit excellent reliability.

Figure 6:
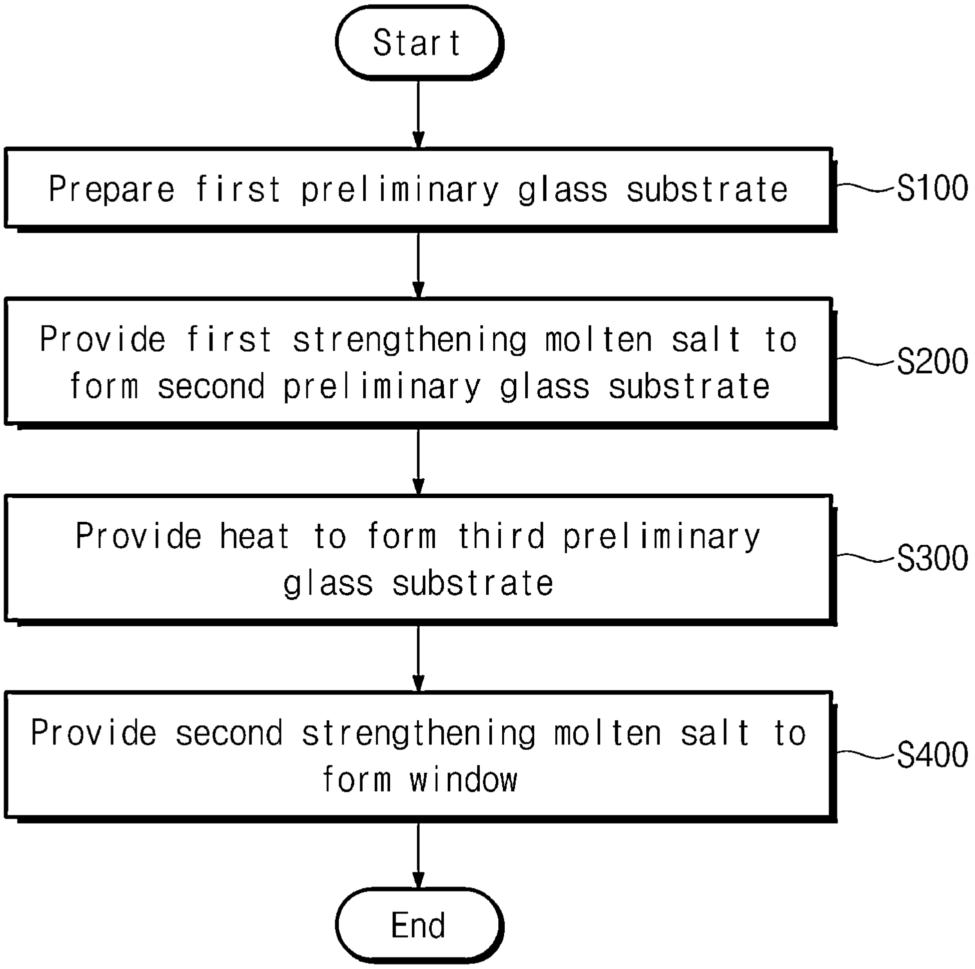
FIG. 6 is a flowchart showing a method of manufacturing a window according to an embodiment.
Figure 7A:
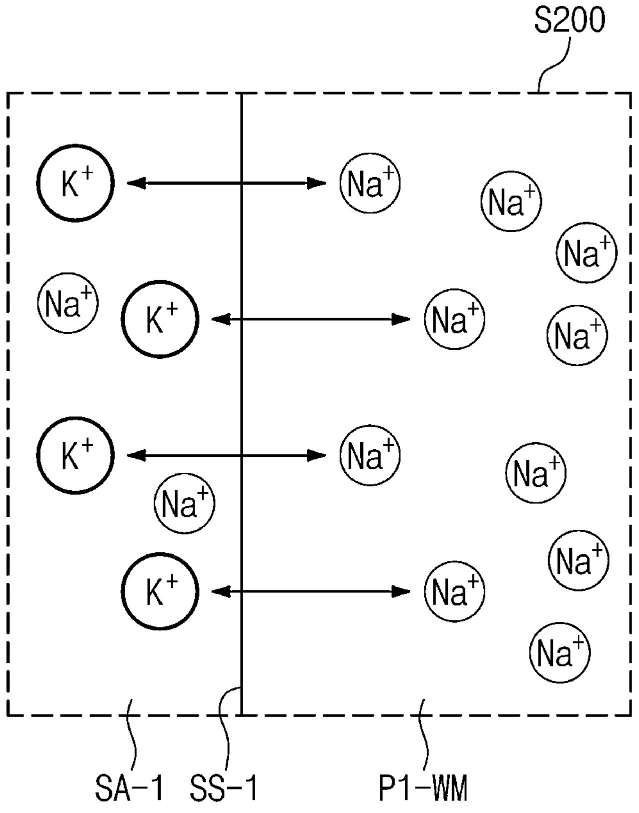
FIG. 7A is a view schematically showing a method of manufacturing a window according to an embodiment.

The window according to an embodiment may be formed through a method of manufacturing a window according to an embodiment. FIG. 6 is a flowchart showing a method of manufacturing a display device according to an embodiment, and FIGS. 7A to 8 schematically show processes of a method of manufacturing a window according to an embodiment. Hereinafter, in descriptions of the method of manufacturing a window according to an embodiment with reference to FIGS. 6 and 8, content overlapping the one described above with reference to FIGS. 1 to 5 will not be described again, and the differences will be mainly described.

The method of manufacturing a window according to an embodiment may include preparing a first preliminary glass substrate (S100), forming a second preliminary glass substrate from the first preliminary glass substrate (S200), forming a third preliminary glass substrate from the second preliminary glass substrate (S300), and forming a window from the third preliminary glass substrate (S400). In addition, the method of manufacturing a window according to an embodiment may further include cleaning and/or cooling between the forming of the second preliminary glass substrate (S200) and the forming of the third preliminary glass substrate (S300), between the forming of the third preliminary glass substrate (S300) and the forming of the window from the third preliminary glass substrate (S400), and after the forming of the window (S400), respectively.

Figure 7B:
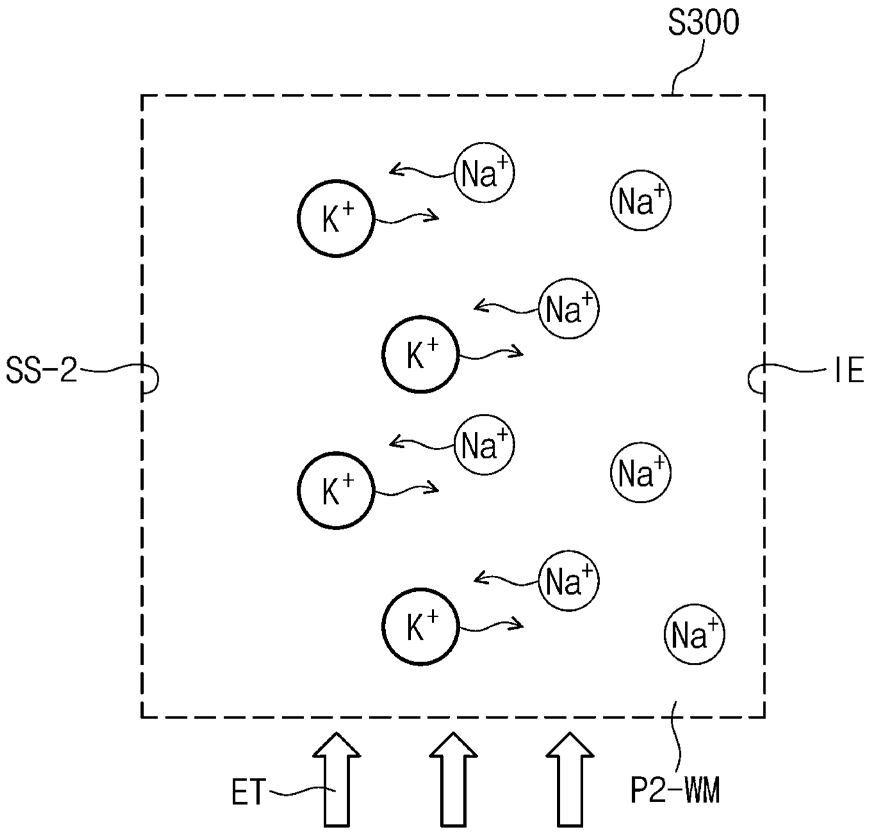
FIG. 7B is a view schematically showing a method of manufacturing a window according to an embodiment.
Figure 7C:
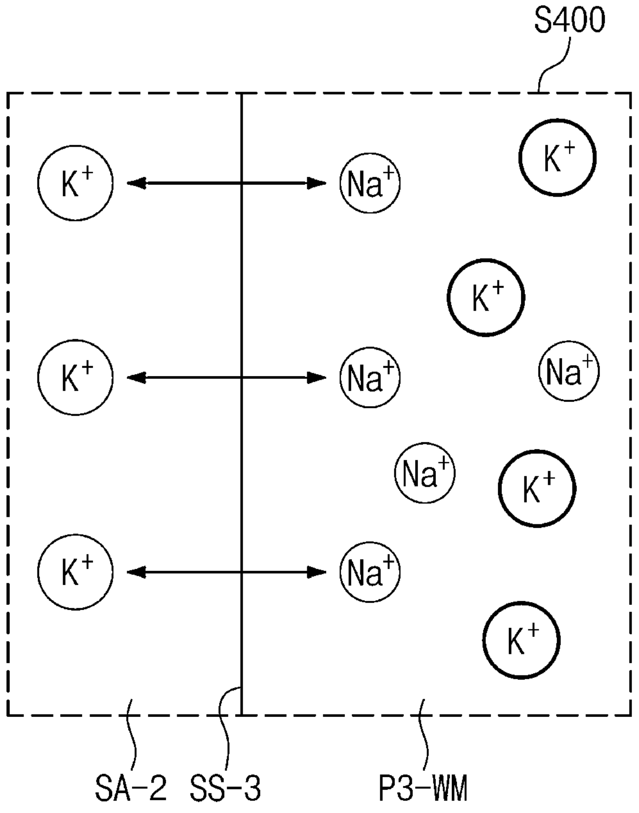
FIG. 7C is a view schematically showing a method of manufacturing a window according to an embodiment.
Figure 8:
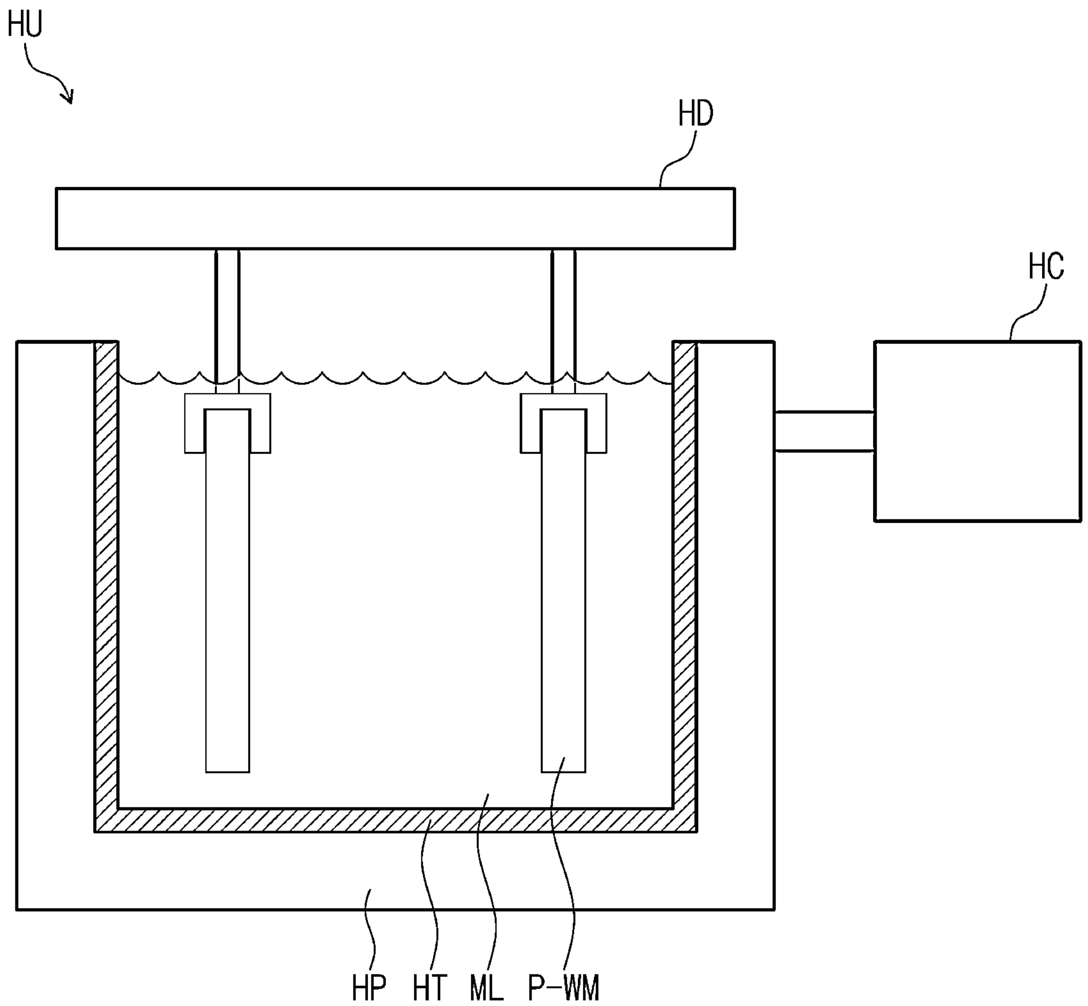
FIG. 8 is a view schematically showing a method of manufacturing a window according to an embodiment.

FIGS. 7A to 7C schematically show movement of ions in each process of the method of manufacturing a window according to an embodiment. FIG. 7A shows providing a first strengthening molten salt to a first preliminary glass substrate to form a second preliminary glass substrate (S200). A first preliminary glass substrate P1-WM may not contain $Li^+$ ions and may include $Na^+$ ions. The first preliminary glass substrate P1-WM may be glass including an alumino-silicate framework formed from $Al_2O_3$ and $SiO_2$. In addition, the first preliminary glass substrate P1-WM may further include at least one of $K^+$ ions or $Mg^{2+}$ ions.

The first preliminary glass substrate P1-WM that does not contain $Li^+$ ions may be purchased at a lower price than the first preliminary glass substrates that contains $Li^+$ ions. Accordingly, in an embodiment, the method of manufacturing a window including preparing the first preliminary glass substrate P1-WM that does not contain $Li^+$ ions may reduce costs.

A second preliminary glass substrate P2-WM (FIG. 7B) may be formed by providing a first strengthening molten salt SA-1 to the first preliminary glass substrate P1-WM. The first strengthening molten salt SA-1 may be provided at a temperature of about 450 to 500 degrees in Celsius (° C.) for about 3 to 9 hours. For example, the first strengthening molten salt SA-1 may be provided at about 500° C. for about 3 to 7 hours.

In an embodiment, the first strengthening molten salt SA-1 may include at least one of $KNO_3$, KCl, or $K_2SO_4$, and $NaNO_3$. That is, the first strengthening molten salt SA-1 may contain $Na^+$ ions and $K^+$ ions.

With respect to the total weight of the first strengthening molten salt SA-1, the first strengthening molten salt SA-1 may contain $NaNO_3$ in an amount of about 20 to 40 percentages by weight (wt %), and may contain at least one of $KNO_3$, KCl, or $K_2SO_4$, in an amount of about 60 to 80 wt %. With respect to the total weight of the first strengthening molten salt SA-1, salt including $K^+$ ions may be provided in an amount of about 60 to 80 wt %. For example, with respect to the total weight of the first strengthening molten salt SA-1, the first strengthening molten salt SA-1 may contain $NaNO_3$ in an amount of about 30 wt % and $KNO_3$ in an amount of about 70 wt %.

$Na^+$ ions included in the first strengthening molten salt SA-1 may be provided to form the compressive stress layer CSL having a greater thickness (FIG. 4). Compared to the case where the first strengthening molten salt does not contain $Na^+$ ions, when the first strengthening molten salt SA-1 contains $Na^+$ ions, the compressive stress layer CSL having a greater thickness (FIG. 4) may be formed.

$K^+$ ions of the first strengthening molten salt SA-1 may be exchanged with $Na^+$ ions of a surface SS-1 of the first preliminary glass substrate P1-WM. $K^+$ ions having a relatively large ionic radius and $Na^+$ ions having a relatively small ionic radius may be exchanged.

Accordingly, $K^+$ ions of the first strengthening molten salt SA-1 may move into the first preliminary glass substrate P1-WM. The surface SS-1 of the first preliminary glass substrate P1-WM may include an upper surface and/or a lower surface of the first preliminary glass substrate P1-WM. In addition, the surface SS-1 of the first preliminary glass substrate P1-WM may include an outer surface of the first preliminary glass substrate P1-WM, which is exposed to the outside.

$Na^+$ ions of the first preliminary glass substrate P1-WM may be exchanged with $K^+$ ions to form a second preliminary glass substrate P2-WM. In the second preliminary glass substrate P2-WM including $K^+$ ions, the compressive stress of a surface SS-2 may be greater than the compressive stress of the surface SS-1 of the first preliminary glass substrate P1-WM.

FIG. 7B shows providing heat to the second preliminary glass substrate to form a third preliminary glass substrate (S300). By providing heat ET to the second preliminary glass substrate P2-WM, $Na^+$ ions and $K^+$ ions may move within the second preliminary glass substrate P2-WM. Referring to FIG. 7B, $Na^+$ ions and $K^+$ ions may move in opposite directions within the second preliminary glass substrate P2-WM. Each of $Na^+$ ions and $K^+$ ions may move according to a difference in chemical potential. That is, $Na^+$ ions may move from a region with a large number of $Na^+$ ions to a region with a small number of $Na^+$ ions, and $K^+$ ions may move from a region with a large number of $K^+$ ions to a region with a small number of $K^+$ ions.

$K^+$ ions may move from the surface SS-2 to an inner surface IE of the second preliminary glass substrate P2-WM, and $Na^+$ ions may move from the inner surface IE to the surface SS-2 of the second preliminary glass substrate P2-WM. The surface SS-2 of the second preliminary glass substrate P2-WM may include an outer surface of the second preliminary glass substrate P2-WM, which is exposed to the outside. The inner surface IE of the second preliminary glass substrate P2-WM is not exposed to the outside, and may be surrounded by the surface SS-2 of the second preliminary glass substrate P2-WM.

In an embodiment, the providing of the heat ET to the second preliminary glass substrate P2-WM may be performed at a temperature of about 400 to 500° C. for about 3 to 7 hours. As the heat ET is provided for about 3 to 7 hours at a temperature of about 400 to 500° C., the compressive stress layer CSL (FIG. 4) having a thickness TH-C of about 80 to 100 μm may be formed. A window formed by providing heat at a temperature of less than about 400° C. or at a temperature of greater than about 500° C. may be formed to have a compressive stress layer having a thickness of less than about 80 μm. The window including the compressive stress layer having a thickness of less than about 80 μm has a small strength, and may thus be vulnerable to external shocks.

The method of manufacturing a window according to an embodiment includes the providing of the heat ET to the second preliminary glass substrate P2-WM to form the third preliminary glass substrate P3-WM (S300), and may thus form a deeper compressive stress layer CSL (FIG. 4). The method of manufacturing a window according to an embodiment includes the providing of the heat ET at a temperature of about 400 to 500° C. for about 3 to 7 hours, and may thus form a compressive stress layer CSL (FIG. 4) having a thickness TH-C of about 80 to 100 μm. Accordingly, the window WM (FIG. 2) including the compressive stress layer CSL (FIG. 4) formed through the method of manufacturing a window according to an embodiment may exhibit increased strength. The display device DD including the window WM (FIG. 2) formed through the method of manufacturing a window according to an embodiment includes regions having different compressive stress change rates (i.e., the first region A10, the second region A20, and the inflection region A30), and may thus exhibit excellent reliability.

FIG. 7C shows forming a window from the third preliminary glass substrate (S400). The window WM (FIG. 2) may be formed by providing the second strengthening molten salt SA-2 to the third preliminary glass substrate P3-WM. The window WM (FIG. 2) including the glass substrate GL (FIG. 4) according to an embodiment may be formed from the third preliminary glass substrate P3-WM.

The second strengthening molten salt SA-2 may be provided to the third preliminary glass substrate P3-WM at a temperature of about 380 to 420° C. for about 1 hour to 2 hours. For example, the second strengthening molten salt SA-2 may be provided to the third preliminary glass substrate P3-WM at about 420° C. for about 1 hour to 2 hours. A window formed by providing the second strengthening molten salt SA-2 for less than 1 hour exhibits a compressive stress of less than about 70 MPa at a depth of about 30 μm from the surface of the window. In addition, a window formed by providing the second strengthening molten salt SA-2 for less than 1 hour exhibits a compressive stress of less than about 50 MPa at a depth of about 50 μm from the surface of the window.

In an embodiment, the window WM (FIG. 2) formed by providing the second strengthening molten salt SA-2 at a temperature of about 380 to 420° C. for about 1 hour to 2 hours may have a compressive stress of about 70 MPa or greater at a depth of about 30 μm, from the surface of the window and a compressive stress of about 50 MPa or greater at a depth of about 50 μm from the surface of the window. Accordingly, the window WM (FIG. 2) formed by providing the second strengthening molten salt SA-2 at a temperature of about 380 to 420° C. for about 1 hour to 2 hours may exhibit increased strength, and the display device DD including the window WM (FIG. 2) may exhibit excellent reliability.

The second strengthening molten salt SA-2 may not contain $NaNO_3$, and may contain at least one of $KNO_3$, KCl, or $K_2SO_4$. That is, the second strengthening molten salt SA-2 may not contain $Na^+$ ions and may contain $K^+$ ions. $K^+$ ions of the second strengthening molten salt SA-2 may be exchanged with $Na^+$ ions of a surface SS-3 of the third preliminary glass substrate P3-WM. $Na^+$ ions on the surface SS-3 of the third preliminary glass substrate P3-WM may include $Na^+$ ions that move due to heat ET from the second preliminary glass substrate P2-WM.

The third preliminary glass substrate P3-WM before the providing of the second strengthening molten salt SA-2 may be in a state in which the compressive stress of the surface SS-3 is reduced. $K^+$ ions move to the inner surface IE (FIG. 7B), and the third preliminary glass substrate P3-WM may thus be in a state in which the compressive stress of the surface SS-3 is reduced. The second strengthening molten salt SA-2 is provided to the third preliminary glass substrate P3-WM, and the compressive stress of the surface SS-3 of the third preliminary glass substrate P3-WM may thus increase. The window WM (FIG. 2) including the glass substrate GL (FIG. 4) formed by exchanging $K^+$ ions with $Na^+$ ions of the third preliminary glass substrate P3-WM may exhibit increased strength.

The method of manufacturing a window according to an embodiment may further include forming a printing layer BZ (FIG. 3) on one surface of the glass substrate GL (FIG. 4). As described above, the printing layer BZ (FIG. 3) may be formed on the lower surface RS of the glass substrate GL (FIG. 4) through a process of printing or deposition.

FIG. 8 shows forming a second preliminary glass substrate from a first preliminary glass substrate (S200) and forming a window from a third preliminary glass substrate (S400). In FIG. 8, the preliminary glass substrate P-WM may be the first preliminary glass substrate P1-WM (FIG. 7A) or the third preliminary glass substrate P3-WM (FIG. 7C).

A strengthening treatment unit HU may be used to provide the first strengthening molten salt SA-1 (FIG. 7A) and the second strengthening molten salt SA-2 (FIG. 7C) to the preliminary glass substrate P-WM. The preliminary glass substrate P-WM may be immersed in a molten solution ML, using the strengthening treatment unit HU. The molten solution ML may include the first strengthening molten salt SA-1 (FIG. 7A) or the second strengthening molten salt SA-2 (FIG. 7C).

The strengthening treatment unit HU may include a tank HT containing the molten solution ML, a heater HP disposed surrounding the tank HT and for applying heat to the molten solution ML in the tank HT, a driver HD for fixing and vertically moving the preliminary glass substrate P-WM to immerse the preliminary glass substrate P-WM in the molten solution ML, and a controller HC for controlling the operation of the strengthening treatment unit HU. The controller HC may control the temperature of the molten solution ML contained in the tank HT.

For example, the controller HC may control the heater HP to heat the molten solution ML at a predetermined temperature and keep the temperature of the molten solution ML at the heated temperature. The heater HP may serve to provide heat to heat the molten solution ML, or serve as a heat insulator to keep the temperature of the heated molten solution ML. The preliminary glass substrate P-WM may be disposed such that the entirety thereof is immersed in the molten solution ML. In FIG. 8, two preliminary glass substrates P-WM are shown to be provided to the strengthening treatment unit HU, but this is merely an example, and one preliminary glass substrates P-WM, or three preliminary glass substrates P-WM or more may be provided.

The method of manufacturing a window may include: providing a first strengthening molten salt to the first preliminary glass substrate that does not contain $Li^+$ ions to form a second preliminary glass substrate; providing heat to the second preliminary glass substrate to form a third preliminary glass substrate; and providing a second strengthening molten salt to the third preliminary glass substrate to form a window. In the providing of heat to the second preliminary glass substrate to form the third preliminary glass substrate, heat may be provided at a temperature of about 400 to 500° C. for a period of about 3 to 7 hours. Accordingly, the window formed through the method of manufacturing a window according to an embodiment may include a compressive stress layer having a deep depth from the surface of the window. A window including a deep compressive stress layer may exhibit increased strength. In addition, the method of manufacturing a window according to an embodiment includes the preparing of the first preliminary glass substrate that does not include $Li^+$ ions, and may thus reduce manufacturing costs.

Hereinafter, with reference to Examples and Comparative Examples, a window according to an embodiment of the invention will be specifically described. In addition, Examples shown below are presented only for the understanding of the invention, and the scope of the invention is not limited thereto.

FIGS. 9 to 15 are graphs showing compressive stress according to depth in the windows of Comparative Examples and Examples, and the compressive stress according to depth is measured through a method of ASTM C770-16 using FSM-6000LE from Orihara Industrial Co., Ltd. In the graphs of FIGS. 9 to 15, a point having a depth of zero corresponds to the surface of the window. The windows of Comparative Examples and Examples were manufactured using T2X-1 (including $SiO_2$ (62.1 wt %), $Al_2O_3$ (17.7 wt %), $B_2O_3$ (0.39 wt %), MgO (2.87 wt %), CaO (0.09 wt %), $ZrO_2$ (0.02 wt %), $Na_2O$ (14.1 wt %), $K_2O$ (2.13 wt %), and $Fe_2O_3$ (0.01 wt %)) from Nippon Electric Glass as a first preliminary glass substrate.

Figure 9:
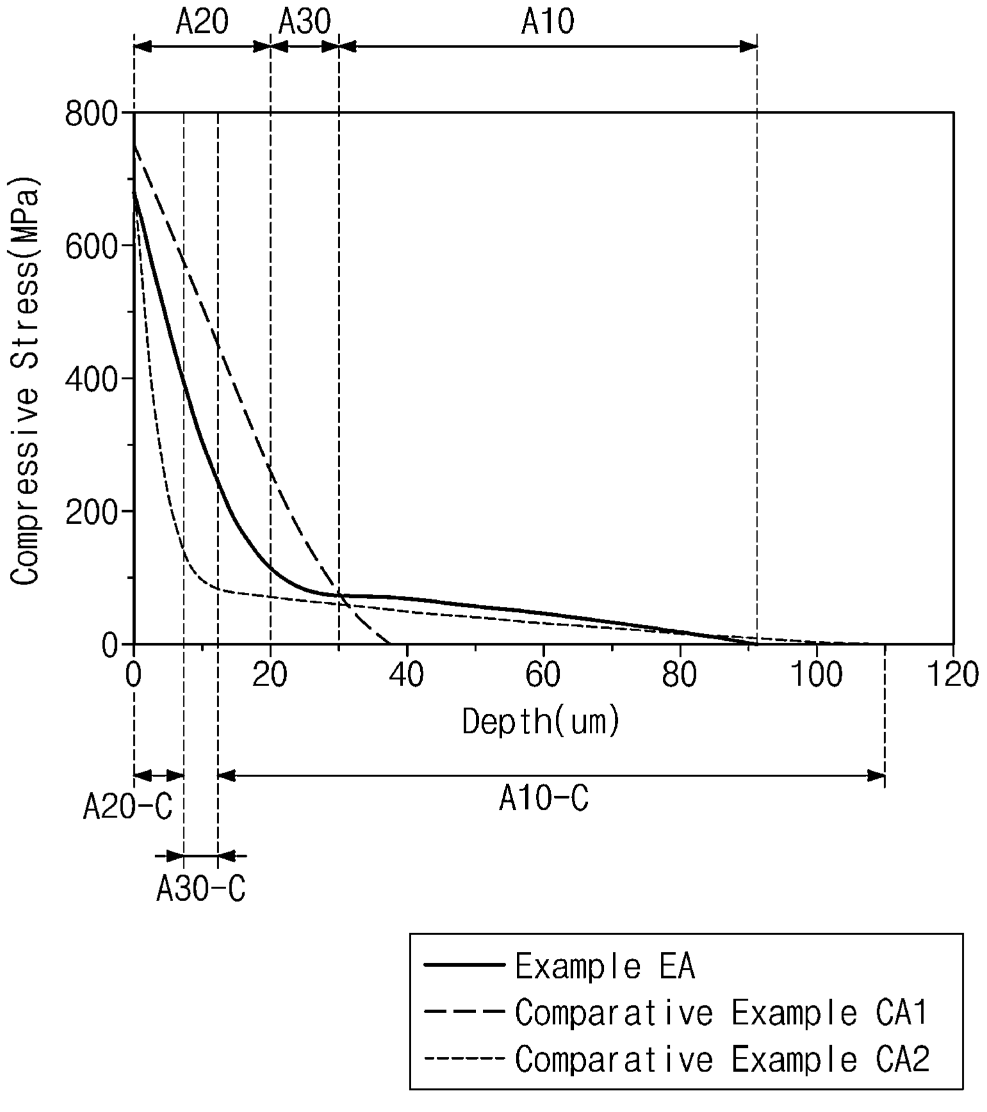
FIGS. 9 to 15 are graphs showing compressive stress according to depth in windows of Comparative Examples and Examples.

FIG. 9 is a graph showing compressive stress according to depth in the windows of Comparative Examples CA1 and CA2 and Example EA. The windows of Comparative Examples CA1 and CA2 and Example EA differ in the method of manufacturing a window. The window of Comparative Example CA1 was formed through a window manufacturing method that includes providing a first strengthening molten salt and does not include providing heat and providing a second strengthening molten salt. The window of Comparative Example CA2 was formed through a window manufacturing method that includes providing a first strengthening molten salt and a second strengthening molten salt, and does not include providing heat. The window of Example EA was formed through a window manufacturing method according to an embodiment, which includes providing a first strengthening molten salt, providing heat, and providing a second strengthening molten salt. The window of Example EA was formed by providing heat at about 480° C. for 7 hours. In Comparative Examples CA1 and CA2 and Example EA, the method of manufacturing the window differs only in the inclusion of each process, and a strengthening molten salt and temperature/time in the providing of a strengthening molten salt are applied under the same conditions.

Referring to FIG. 9, it is seen that the window of Example EA includes a first region A10, a second region A20, and an inflection region A30. In the window of Example EA, it is seen that the inflection region A30 has a minimum depth of about 20 μm from the surface of the window. It is seen that the compressive stress layer including the first region A10, the second region A20, and the inflection region A30 in the window of Example EA has a thickness of about 90 to 100 μm. Accordingly, the window formed through the method of manufacturing a window according to an embodiment including the providing of heat may include an inflection region A30 having a minimum depth of about 15 to 30 μm from the surface of the window. In addition, the window formed through the method of manufacturing a window according to an embodiment including the providing of heat may include a compressive stress layer having a thickness of about 80 to 100 μm.

It is seen that compared to the window of Example EA, the window of Comparative Example CA1 formed through a window manufacturing method that does not include the providing of heat and the providing of the second strengthening molten salt does not include the inflection region and the second region. It is seen that in the windows of Comparative Example CA1, the compressive stress layer has a depth of less than about 40 μm. The window of Comparative Example CA1 in which the compressive stress layer has a depth of less than about 40 μm exhibits a smaller strength than the window of Example EA in which the compressive stress layer has a depth of 80 μm or greater.

It is seen that the window of Comparative Example CA2 formed through a window manufacturing method that does not include the providing of heat includes a first region A10-C, a second region A20-C, and an inflection region A30-C, but in the window of Comparative Example CA2, the second region A20-C is very thin, and the inflection region A30-C has a minimum depth of about 10 μm or less. The window of Comparative Example CA2, in which the second region A20-C showing a relatively high compressive stress value is thin, exhibits a smaller strength than the window of Example EA.

Figure 10:
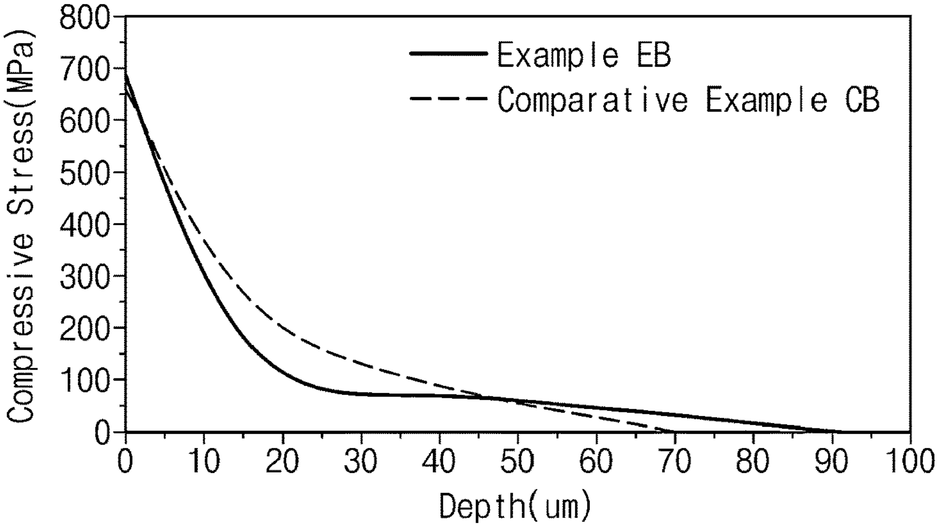

In FIG. 10, the windows of Comparative Example CB and Example EB differ only in the inclusion of the providing of heat in the manufacturing method. The window of Comparative Example CB was formed through a window manufacturing method that includes providing a first strengthening molten salt and a second strengthening molten salt, and does not include providing heat. The window of Example EB was formed through a window manufacturing method according to an embodiment, which includes providing a first strengthening molten salt, providing heat, and providing a second strengthening molten salt. The windows of Comparative Example CB and Example EB were formed in the same manner except for the providing of heat in the window manufacturing method.

In FIG. 10, the window of Comparative Example CB exhibits a compressive stress of about 130 MPa at a depth of about 30 μm and a compressive stress of about 56 MPa at a depth of about 50 However, it is seen that in the window of Comparative Example CB, the compressive stress layer has a thickness of about 70 μm. That is, it is seen that the window of Comparative Example CB has a compressive stress layer having a thickness of less than about 80 μm.

In FIG. 10, the window of Example EF1 exhibits a compressive stress of about 72 MPa at a depth of 30 μm from a surface of the window, and a compressive stress of 59 MPa at a depth of 50 μm. It is seen that the window of Example EB has an inflection region formed at a depth of about 15 to 30 μm. It is seen that in the window of Example EB, the compressive stress layer has a thickness of about 90 μm or greater. That is, the window of Example EB satisfies the thickness range of the compressive stress layer and the minimum depth of the inflection region according to an embodiment. Accordingly, it is believed that the window formed through the window manufacturing method according to an embodiment, which includes the providing of heat includes a compressive stress layer having a minimum depth of about 15 to 30 μm and a thickness of about 80 to 100 μm to exhibit increased strength.

Figure 11:
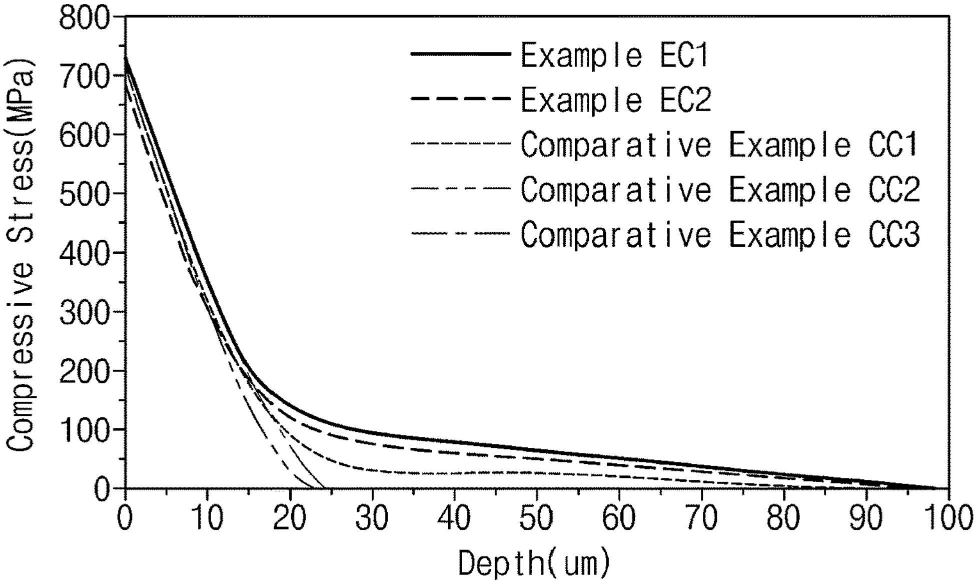

In FIG. 11, the windows of Comparative Examples CC1 to CC3 and Examples EC1 and EC2 were formed through a window manufacturing method in which the temperature in the providing of heat is different. The windows of Comparative Examples CC1 to CC3 were formed by providing heat at a temperature greater than about 500° C., and the window of Comparative Example CC1 was formed by providing heat at about 510° C. The window of Comparative Example CC2 was formed by providing heat at about 520° C., and the window of Comparative Example CC3 was formed by providing heat at about 530° C. The windows of Examples EC1 and EC2 were formed by providing heat at a temperature of about 400 to 500° C. The window of Example EC1 was formed by providing heat at about 480° C., and the window of Example EC2 was formed by providing heat at about 500° C. The windows of Comparative Examples CC1 to CC3 and Examples EC1 and EC2 were formed in the same manner, except for the temperature in the providing of heat in the window manufacturing method.

In FIG. 11, the window of Example EC1 exhibited a compressive stress of 94 MPa at a depth of 30 μm, and a compressive stress of 64 MPa at a depth of 50 μm. The window of Comparative Example CC1 exhibited a compressive stress of 74 MPa at a depth of 30 μm, and a compressive stress of 49 MPa at a depth of 50 μm.

Referring to FIG. 11, it is seen that in the windows of Examples EC1 and EC2, the compressive stress layer has a thickness of about 80 to 100 μm. It is seen that in the windows of Comparative Examples CC2 and CC3, the compressive stress layer has a thickness of less than about 30 μm. Accordingly, the window formed through the method of manufacturing a window according to an embodiment including the providing of heat at a temperature of about 400 to 500° C. may include a compressive stress layer having a thickness of about 80 to 100 μm. In an embodiment, the window including a compressive stress layer having a thickness of about 80 to 100 μm may exhibit increased strength.

Figure 12:
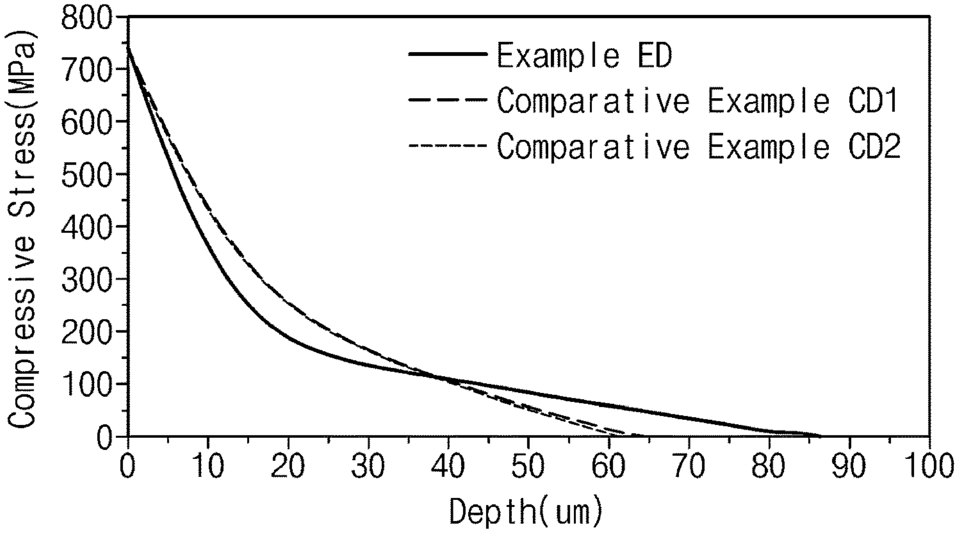

In FIG. 12, the windows of Comparative Examples CD1 and CD2 and Example ED were formed through a window manufacturing method in which the temperature in the providing of heat is different. The windows of Comparative Examples CD1 and CD2 and Example ED were formed in the same manner, except for the temperature in the providing of heat in the window manufacturing method.

The window of Comparative Example CD1 was formed by providing heat at about 100° C., the window of Comparative Example CD2 was formed by providing heat at about 300° C., and the window of Example ED was formed by providing heat at about 480° C. That is, the window of Example ED was formed by providing heat at a temperature of about 400 to 500° C., which is the temperature range of the providing of heat in the window manufacturing method according to an embodiment.

Table 1 below specifically shows the compressive stress, the minimum depth of the inflection region, and the thickness of the compressive stress layer in the windows of Comparative Examples CD1 and CD2 and Example ED of FIG. 12. In Table 1, CS indicates the compressive stress on the surface of the window, CS30 indicates the compressive stress at a depth of about 30 μm from the surface of the window, and CS50 indicates the compressive stress at a depth of about 50 μm from the surface of the window.

TABLE 1

| Item | CS (MPa) | CS30 (MPa) | CS50 (MPa) | Minimum depth of inflection region (μm) | Thickness of compressive stress layer (μm) |
|---|---|---|---|---|---|
| Comparative Example CD1 [100° C.] | 738 | 164 | 54 | 23 | 63 |
| Comparative Example CD2 [300° C.] | 732 | 161 | 48 | 23 | 62 |
| Example ED [480° C.] | 742 | 134 | 81 | 18 | 84 |

Referring to Table 1, it is seen that the windows of Comparative Examples CD1 and CD2 and Example ED have a compressive stress of about 600 to 1000 MPa on surfaces of the windows, satisfying the range of the maximum value of the compressive stress in a second region of a compressive stress layer according to an embodiment. It is seen that the windows of Comparative Examples CD1 and CD2 and Example ED have a compressive stress of about 70 MPa or greater at a depth of about 30 μm, which satisfies the range of compressive stress values at a depth of about 30 μm from the surface of the window according to an embodiment. It is seen that the windows of Comparative Example CD1 and Example ED have a compressive stress of about 50 MPa or greater at a depth of about 50 μm, which satisfies the range of compressive stress values at a depth of about 50 μm from the surface of the window according to an embodiment. It is seen that in the windows of Comparative Examples CD1 and CD2 and Example ED, a minimum depth of an inflection region is about 15 to 30 μm, which satisfies the minimum depth range of the inflection region according to an embodiment.

It is seen that in the windows of Comparative Examples CD1 and CD2, the compressive stress layer has a thickness of less than about 80 μm. It is seen that compared to the windows of Comparative Examples CD1 and CD2, in the window of Example ED, the compressive stress layer has a thickness of about 80 μm or greater. That is, the window of Example ED satisfies the thickness range of the compressive stress layer according to an embodiment. Accordingly, the window formed through the method of manufacturing a window according to an embodiment including providing heat at a temperature of about 400 to 500° C. may include a compressive stress layer having a thickness of about 80 to 100 μm. The window including the compressive stress layer having a thickness of about 80 to 100 μm may exhibit increased strength, including the compressive stress layer having a greater thickness.

Figure 13:
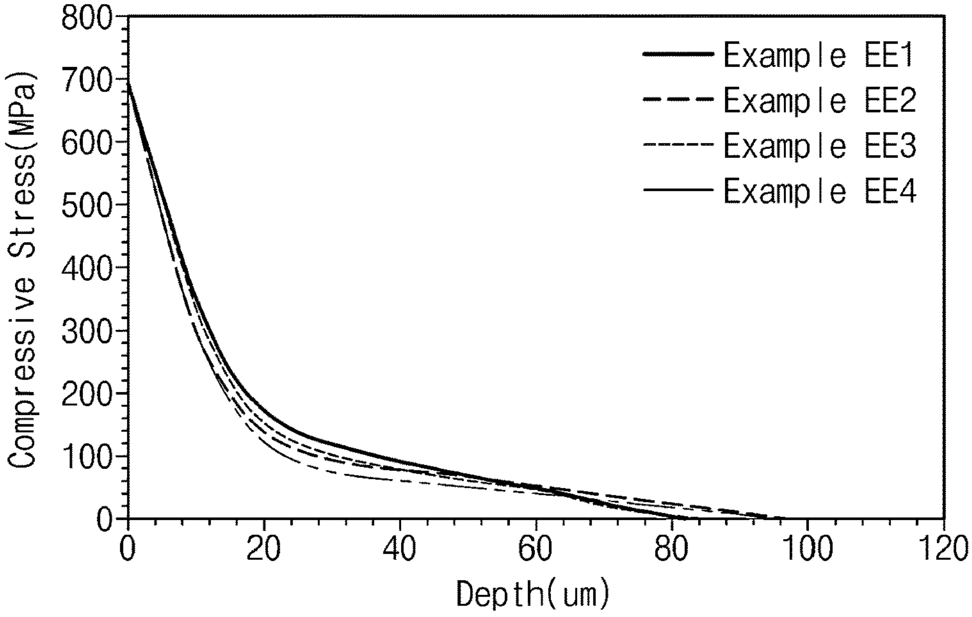

In FIG. 13, the windows of Examples EE1 to EE4 were formed through a window manufacturing method in which temperature and/or time in the providing of heat are/is different. The window of Example EE1 was formed by providing heat at about 480° C. for about 3 hours, and the window of Example EE2 was formed by providing heat at about 480° C. for about 7 hours. The window of Example EE3 was formed by providing heat at about 500° C. for about 3 hours, and the window of Example EE4 was formed by providing heat at about 500° C. for about 7 hours. That is, the windows of Examples EE1 to EE4 were formed through a window manufacturing method satisfying the range of temperature and time in the providing of heat according to an embodiment. The windows of Examples EE1 to EE4 were formed in the same manner, except for the temperature and/or time in the providing of heat.

Referring to FIG. 13, it is seen that the windows of Examples EE1 to EE4 have a similar tendency of compressive stress according to a depth from a surface of the windows. It is seen that the windows of Examples EE1 to EE4 have a maximum value of compressive stress on the window surfaces (i.e., a depth of 0 μm) of about 700 MPa, which satisfies the range of compressive stress of about 600 to 1000 MPa on the surface of the window according to an embodiment. In addition, it is seen that in the windows of Examples EE1 to EE4, the compressive stress layer has a thickness of about 80 to 100 μm. Accordingly, the window formed through the method of manufacturing a window according to an embodiment, which includes the providing of heat at a temperature of about 400 to 500° C. for a period of about 3 to 7 hours may exhibit increased strength.

Figure 14:
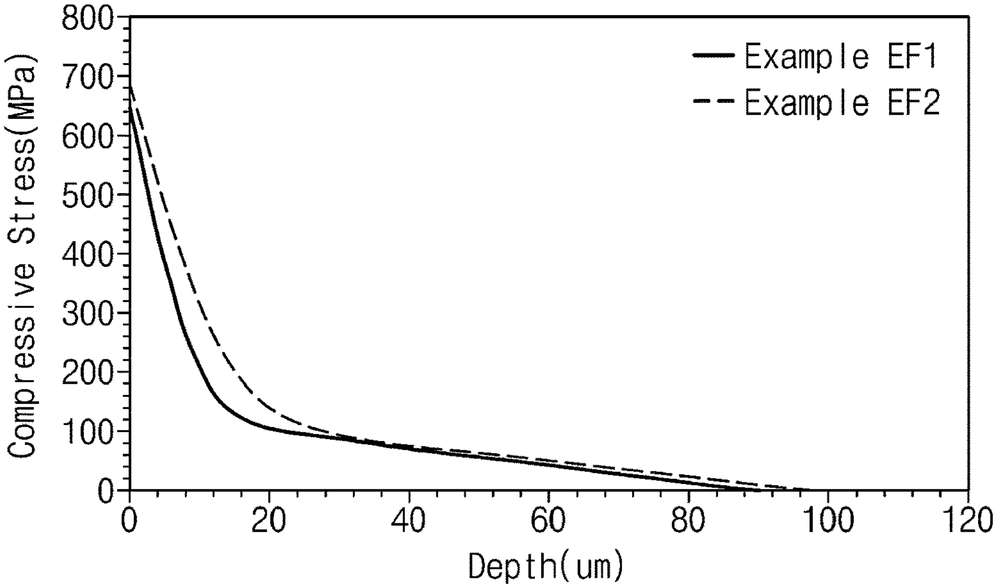

In FIG. 14, the windows of Examples EF1 and EF2 were formed through the method of manufacturing a window according to an embodiment, and the windows of Examples EF1 and EF2 correspond to a case where the temperature in the providing of a second strengthening molten salt is different. The window of Example EF1 was formed by providing the second strengthening molten salt at about 390° C., and the window of Example EF2 was formed by providing the second strengthening molten salt at about 420° C. The windows of Examples EF1 and EF2 were formed in the same manner, except for the temperature in the providing of the second strengthening molten salt.

In FIG. 14, the window of Example EF1 exhibited a compressive stress of 87.64 MPa at a depth of 30 μm, and a compressive stress of 58.72 MPa at a depth of 50 μm. The window of Example EF2 exhibited a compressive stress of 94 MPa at a depth of 30 μm, and a compressive stress of 64 MPa at a depth of 50 μm. That is, the windows of Examples EF1 and EF2 satisfy the compressive stress according to an embodiment at depths of 30 μm and 50 μm.

Referring to FIG. 14, it is seen that the windows of Examples EF1 and EF2 include a compressive stress layer having a thickness of about 80 to 100 μm, and a minimum depth in the inflection region is about 15 to 30 μm. Accordingly, the window formed through the method of manufacturing a window according to an embodiment, which includes the providing of the second strengthening molten salt at a temperature of about 380 to 420° C. may exhibit increased strength.

Figure 15:
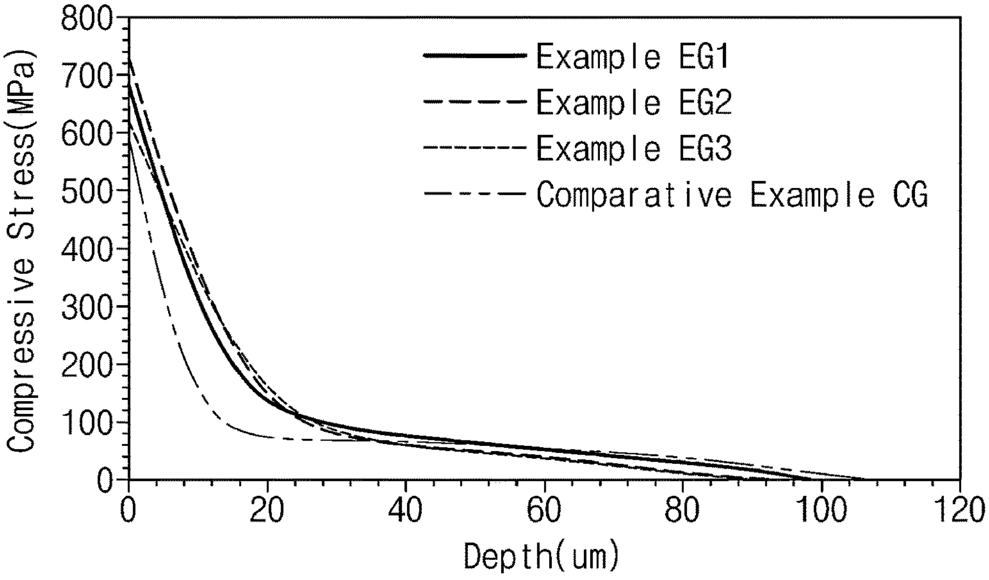

In FIG. 15, the windows of Comparative Example CG and Examples EG1 to EG3 were formed through a window manufacturing method in which the time in the providing of the second strengthening molten salt is different. The window of Comparative Example CG was formed by providing the second strengthening molten salt for 30 minutes. The windows of Examples EG1 to EG3 were formed by providing the second strengthening molten salt for about 1 hour to 2 hours, and the window of Example EG1 was formed by providing the second strengthening molten salt for 75 minutes. The window of Example EG2 was formed by providing the second strengthening molten salt for 100 minutes, and the window of Example EG3 was formed by providing the second strengthening molten salt for 120 minutes. The windows of Comparative Example CG and Examples EG1 to EG3 were formed in the same manner, except for the time period in the providing of the second strengthening molten salt.

Referring to FIG. 15, it is seen that the windows of Examples EG1 to EG3 have a compressive stress of about 600 to 1000 MPa on the surface (i.e., a depth of 0 μm). In contrast, it is seen that the window of Comparative Example CG has a compressive stress of less than about 600 MPa on the surface. In addition, it is seen that the window of Comparative Example CG exhibits a smaller compressive stress than the windows of Examples EG1 to EG3 at a depth of about 30 μm. Accordingly, the window formed through the method of manufacturing a window according to an embodiment, which includes the providing of the second strengthening molten salt for about 1 hour to 2 hours may exhibit an increased compressive stress value on the surface.

A display device according to an embodiment may include a display module and a window disposed on at least one of an upper portion or a lower portion of the display module. The window may include a glass substrate that does not contain $Li^+$ ions and contains $K^+$ ions. The window may include a compressive stress layer that includes a first region, a second region, and an inflection region formed between the first region and the second region. The first region may have a first compressive stress change rate, the second region may have a second compressive stress change rate greater than the first compressive stress change rate, and the inflection region may have a third compressive stress change rate that increase from the first compressive stress change rate to the second compressive stress change rate. The compressive stress change rate may be defined as a compressive stress change rate according to a depth. In an embodiment, in the thickness direction, a minimum depth from the surface of the window to the inflection region may be about 15 to 30 μm, and the compressive stress layer may have a thickness of about 80 to 100 μm. Accordingly, the window according to an embodiment may exhibit increased strength, and a display device including the window according to an embodiment may exhibit excellent reliability.

The window according to an embodiment may be formed through a method of manufacturing a window according to an embodiment. The method of manufacturing a window may include: preparing a first preliminary glass substrate that does not contain $Li^+$ ions and contains $Na^+$ ions; providing a first strengthening molten salt to the first preliminary glass substrate to form a second preliminary glass substrate; providing heat to the second preliminary glass substrate at a temperature of about 400 to 500° C. for a period of about 3 to 7 hours to form a third preliminary glass substrate; and providing a second strengthening molten salt to the third preliminary glass substrate to form a window. The window formed through the method of manufacturing a window according to an embodiment, which includes the providing of heat at a temperature of about 400 to 500° C. for a period of about 3 to 7 hours may include a compressive stress layer according to an embodiment to exhibit increased strength. In addition, the method of manufacturing a window according to an embodiment includes the preparing of a preliminary glass substrate that does not include $Li^+$ ions, and may thus reduce manufacturing costs.

A method of manufacturing a window according to an embodiment may include providing heat to manufacture a window according to an embodiment, which exhibits increased strength.

A window according to an embodiment and a display device including the window may exhibit increased strength.

Although described with reference to exemplary embodiments of the present disclosure, it will be understood that various changes and modifications of the present disclosure may be made by one ordinary skilled in the art or one having ordinary knowledge in the art without departing from the spirit and technical field of the present disclosure as hereinafter claimed.

Accordingly, the technical scope of the invention is not intended to be limited to the contents set forth in the detailed description of the specification, but is intended to be defined by the appended claims.

What is claimed is:

1. A method of manufacturing a window, the method comprising:

preparing a first preliminary glass substrate that does not contain $Li^+$ ions and contains $Na^+$ ions;

providing a first strengthening molten salt to the first preliminary glass substrate to form a second preliminary glass substrate, wherein the first strengthening molten salt comprises $NaNO_3$ and at least one of $KNO_3$, KCl, or $K_2SO^4$, wherein with respect to a total weight of the first strengthening molten salt, $NaNO_3$ is provided in an amount of about 20 to 40 percentages by weight (wt %), and the at least one of $KNO_3$, KCl, or $K_2SO_4$ is provided in an amount of about 60 to 80 wt %, and wherein the first strengthening molten salt is provided at a temperature of about 450 to 500° C. for a period of about 3 to 9 hours;

providing heat to the second preliminary glass substrate at a temperature of about 400 to 500 degrees in Celsius (° C.) for a period of about 3 to 7 hours to form a third preliminary glass substrate; and providing a second strengthening molten salt to the third preliminary glass substrate to form a window comprising a glass substrate, wherein the second strengthening molten salt does not contain NaNO3 and contains at least one of $KNO_3$, KCl, or $K_2SO_4$, and is provided at a temperature of about 380 to 420° C. for a period of about 1 hour to 2 hours, wherein the window comprises a compressive stress layer having a compressive stress of about 742 megapascals (MPa) or less as measured through a method of ASTM C770-16, and the compressive stress layer has a thickness of about 80 to 100 micrometers (μm) and wherein with respect to 100% of a total thickness of the glass substrate, the thickness of the compressive stress layer is about 13 to 21%.

2. The method of claim 1, wherein the first preliminary glass substrate further comprises at least one of $K^+$ ions or $Mg^{2+}$ ions.

3. The method of claim 1, further comprising forming a printing layer in the forming of the window.

* * * * *